United States Patent [19]

Brandt et al.

[11] 4,320,203
[45] Mar. 16, 1982

[54] CERAMIC ALLOY

[75] Inventors: Gunnar Brandt, Solna; Carl P. Björkman, Stockholm; Carl S. G. Ekemar, Saltsjö-Boo, all of Sweden

[73] Assignee: Sandvik Aktiebolag, Sandviken, Sweden

[21] Appl. No.: 181,866

[22] Filed: Aug. 27, 1980

[30] Foreign Application Priority Data

Sep. 3, 1979 [SE] Sweden .................................. 7907304

[51] Int. Cl.$^3$ ........................ C04B 35/56; C04B 35/58
[52] U.S. Cl. ......................................... 501/87; 501/96; 501/153; 75/203; 75/205; 75/206; 51/309
[58] Field of Search .................... 106/43, 73.4; 51/309; 75/203, 205, 206

[56] References Cited

U.S. PATENT DOCUMENTS

| 4,022,584 | 5/1977 | Rudy | 106/73.4 |
| 4,204,873 | 5/1980 | Yamamoto et al. | 106/73.4 |
| 4,249,914 | 2/1981 | Ogawa et al. | 51/309 |

FOREIGN PATENT DOCUMENTS

| 2630687 | 1/1977 | Fed. Rep. of Germany . |
| 2733063 | 11/1978 | Fed. Rep. of Germany . |
| 50-89410 | 7/1975 | Japan . |
| 51-5216 | 1/1976 | Japan . |
| 51-6109 | 1/1976 | Japan . |
| 52-37913 | 3/1977 | Japan . |

OTHER PUBLICATIONS

Egorov, F. et al., "Effect of Nitrogen on the Sintering of ZrN-Al$_2$O$_3$ Mixtures" Ceramic Abstracts, vol. 57, No. 7/8, 1978, p. 178, col. 1.

McCauley, J. W., "A Simple Model for Aluminum Oxynitride Spinels" JACS vol. 61, No. 7/8, 1978, pp. 372, 373.

Bradt, R., "Microstructure in Ceramic Cutting Tools" JACS vol. 44, No. 11, (1965), pp. 895–898.

Whitney, E., "New Advances in Ceramic Tooling" SME Technical Report MRR 76-15.

Pentecost, J. et al., "Oxide Ceramics in Metal Cutting Applications" in *Ceramics in Severe Environments* pp. 231–244.

Primary Examiner—Earl C. Thomas
Assistant Examiner—Mark Bell
Attorney, Agent, or Firm—Burns, Doane, Swecker & Mathis

[57] ABSTRACT

Ceramic materials intended for cutting and consisting of aluminum oxide with additives of hard carbides or nitrides, particularly titanium carbide, have up to now, because of their sintering inertia, in general been pressure sintered to obtain satisfactory properties. According to the present invention a ceramic alloy of excellent technological properties has been formed and comprises principally Al$_2$O$_3$ and hard nitrides or carbonitrides, such as TiN or Ti(C,N) in which the alloy contains from 2 to 95 v/o of an Al—O—N-compound, such as nitrogen stabilized aluminum oxide with cubic or nearly cubic structure.

19 Claims, 4 Drawing Figures

Fig. 2

CERAMIC ALLOY

BACKGROUND OF THE PRESENT INVENTION

The present invention relates to a ceramic alloy with excellent properties particularly for use as an insert for cutting. More particularly, the invention is related to the type of cutting material which is based essentially on ceramic oxide, that is, principally aluminum oxide to which additions of nitrides or carbonitrides from the groups IV B, V B and VI B of the periodic system have been made to attempt to increase the toughness and the thermal shock resistance.

Ceramic materials based on aluminum oxide have been available for a very long time. The mechanical properties of this class of materials have constantly been improved because of a better understanding of the influence of the microstructure and by improved process technique.

The field of application of these ceramic materials was essentially enlarged when it was found that alloying additives could increase the toughness and the thermal shock resistance of these materials. This effect was principally obtained by addition of titanium carbide in concentrations of 25 to 40 w/o (weight percent). The latter class of materials have been used in milling of steel and cast iron.

However, a serious disadvantage of the latter class of material is that they generally must be sintered under pressure to obtain optimal properties because of their sintering inertia. Consequently, the material can be expensive to produce and the geometry of the produced inserts must be limited to very simple forms.

In spite of their good properties (among others an excellent chemical stability), nitrides have up to now not been often used as alloying additives to ceramic materials. The reason, among other things, is the difficulty in obtaining a material without porosity for materials made with nitride additions of the same magnitude as the carbide addition used in commercial mixed ceramic materials. It is well known that even a very small amount of pores has a very negative influence on the cutting properties of ceramic materials.

Lately, an increased interest in materials of oxide-nitride type has been noticed. Thus, alloys based on nitrides and aluminum-oxide have been investigated by among others Rudy (cf. the Swedish patent application No. 7607895-5 or the corresponding German Pat. No. 2,630,687). The investigated alloys comprised among others: $Al_2O_3$—TiN, $Al_2O_3$—MgO—TiN, $Al_2O_3$—Ti(C,N), $Al_2O_3$—Ti(N,O), $Al_2O_3$—MgO—(Ti,Mo)(C,N), $Al_2O_3$—(Ti,Nb)N, $Al_2O_3$—(Ti,V)N, $Al_2O_3$—MgO—(Ti,Mo,Cr)(C,N), $Al_2O_3$—(Zr,Ti)(N,O), $Al_2O_3$—(Ti,Nb)(N,O), $Al_2O_3$—MgO—Hf(C,N), $Al_2O_3$—Ni—Mo—(Ti,Mo)(C,N), $Al_2O_3$—ZrN, $Al_2O_3$—MgO—(Ti,Cr)(C,N), $Al_2O_3$—(Ti,Cr)(C,N) of different sintering procedures. The best technological properties were obtained for the pressure sintered materials. In turning in steel, where the criterion was the life to breakage, a shorter life was obtained for all variants except TiN—$Al_2O_3$ and $Al_2O_3$—MgO(Ti,Mo)(C,N) compared to a commercial material of TiC—$Al_2O_3$-Type. However, TiN—$Al_2O_3$ was grouped to a different geometry so a direct comparison cannot be made. The alloy $Al_2O_3$—MgO—(Ti,Mo)(C,N) was comparable with the commercial material.

Among further publications relating to nitride-aluminum-oxide alloys, there is the Japanese publication (Kokai) No. 50-89410 (published July 17, 1975). Among other things, there is disclosed a pressure sintered alloy consisting of 75 v/o (volume percent) $Al_2O_3$ and 25 v/o TiN compared with a commercial pressure sintered material consisting of 75 v/o $Al_2O_3$ and 25 v/o TiC. In turning of steel (cutting speed 800 m/min) less crater wear and flank wear were obtained and in milling (cutting speed 600 m/min) better crater wear resistance of the $Al_2O_3$—TiN-alloy was obtained compared with the commercial material.

Japanese publication (Kokai) No. 51-5216 (published Jan. 16, 1976) discloses alloys consisting of aluminum oxide and nitride, carbonitride or carbide. Among other alloys, pressure sintered alloys with 70 w/o $Al_2O_3$ and 30 w/o of a solid solution of TiN/TiC with m/o (or mole percent): 100/0, 70/30, 50/50, 30/70, 10/90, 0/100 were investigated. In turning (cutting speed 500 m/min), an increasing crater wear resistance was obtained with increasing TiN-concentration, while the flank wear was very much increased when the TiN-concentration exceeded 50 m/o in Ti(C,N), so that the flank wear resistance of the last mentioned alloys was lower than the one of TiC—$Al_2O_3$. In milling (cutting speed 500 m/min), better results were obtained for $Al_2O_3$—Ti(C,N), with TiN-concentrations up to 50 m/o in Ti(C,N), compared with TiC—$Al_2O_3$. For higher TiN-concentrations, a considerable abrasive wear was obtained.

Also, the Japanese publication (Kokai) No. 51-6109 (published Jan. 19, 1976) concerns sintered alloys of the type aluminum oxide-titanium carbide-titanium nitride and among other alloys pressure sintered $Al_2O_3$—TiC—TiN-alloys with 0.8 v/o Ni have been investigated. The TiC/TiN-ratio was kept constant 50/50 m/o and the fraction TiC/TiN was 0.5, 10, 20, 40, 60, 80, 90 and 100 v/o respectively. In turning of steel the best results, that is the lowest values of flank wear and damages because of breakages, were obtained for TiC/TiN-concentrations between 5 and 80 v/o.

Furthermore, pressure sintered alloys with 55 v/o $Al_2O_3$, 5 v/o Ni and 40 v/o TiC-TiN where the TiN-fraction was 0.5, 10, 30, 50, 70, 80, 90, 95 and 100 m/o were investigated. Turning tests in steel gave good results, that is low values of flank wear and damages caused by breakages, for TiN-concentrations between 5 and 95 m/o in TiC/TiN. Solely TiC gave a high frequency of breakages.

Inserts were formed of another seres of pressure sintered alloys with 60 v/o $Al_2O_3$ and 40 v/o TiC/TiN (50/50 v/o), to which were added 0, 1, 5, 10, 15, 20 and 25 v/o Ni. These inserts were tested in turning. For 0% Ni, a relatively high value of the frequency of breakages were obtained and for Ni-concentrations exceeding 15 v/o abrasive wear increased strongly.

Japanese publication (Kokai) 52-37913 (published Mar. 24, 1977) involves sintered alloys of the type aluminum oxide-titanium nitride-magnesium oxide. Among other alloys, pressure sintered alloys with 74.5 w/o $Al_2O_3$, 0.5 w/o MgO and 25 w/o Ti (C,N) with varying nitrogen concentration of the Ti (C,N)-phase were investigated. In turning tests a strongly increased flank wear was obtained when carbon substituted nitrogen in an amount such as the nitrogen concentration of the Ti(C,N)-phase was below 19.0 w/o. Furthermore pressure sintered alloys with 69.5 w/o $Al_2O_3$, 0.5 w/o MgO and 30 w/o Ti (N,O) with varying oxygen concentration of the TiN-phase were investigated. In turning tests a strong decrease of life (the criterion being flank wear of 0.3 mm) was obtained if the N-concentration of the TiN-phase was below 19 w/o. A pressure sintered alloy with 74.5 w/o Al$_2$O$_3$, 0.5 w/o MgO and 25 w/o TiN (N>19.0 w/o) was tested in turning (v=300 m/min) and compared with a commercial pressure sintered mixed ceramic alloy with 70 w/o Al$_2$O$_3$ and 30 w/o TiC. The commercial material obtained a considerably greater flank wear. A pressure sintered alloy with 69.2 w/o Al$_2$O$_3$, 0.3 w/o MgO, 0.5 w/o NiO and 30 w/o TiN (N>19.0 w/o) showed a better flank wear resistance in turning tests, and in milling tests a longer milled length before breakage compared with a commercial material with 70 w/o Al$_2$O$_3$ and 30 w/o TiC.

Thus, in summary, alloys based on aluminum oxide and nitrides or carbonitrides of other metals, principally titanium, are well documented in the patent literature. Any corresponding commercial material or alloys accessible to tests and investigations have up to now not appeared. Thus, the production of the different suggested alloys must have involved great difficulties. Furthermore, the necessity of pressure sintering to obtain optimal properties may have turned out not to be economical

OBJECTS AND SUMMARY OF THE PRESENT INVENTION

It is an object of the present invention to avoid or alleviate the problems of the prior art.

It is also an object of the present invention to provide a ceramic alloy having good cutting and machining properties and which may be efficiently and economically produced.

In one embodiment, there is provided a ceramic alloy composition comprising from about 40 to about 95 w/o of aluminum oxide, from about 5 to about 60 w/o nitrides and/or carbonitrides of one or more metals of the groups IV B, V B and VI B of the periodic system and from about 0 to about 2 w/o of one or more sintering promoting oxides, the total composition of said nitrides and/or carbonitrides being given by the expression $(M_aM'_bM''_c)(C_xN_yO_z)_v$ where
M=Ti, Zr, Hf
M'=V, Nb, Ta
M''=Cr, Mo, W
and
a+b+c=1, b+c≦0.20; 0.85≦v≦1.05, x+y+z=1, z≦0.15, x≦0.5;

the composition being further characterized in that from 2 to 95 v/o of the aluminum oxide has a nitrogen-containing aluminum oxide with spinel like cubic or nearly cubic structure, the balance of the aluminum oxide comprising the stable hexagonal (corundum) structure.

In another embodiment, there is provided a method of forming a ceramic alloy composition comprising forming a mixture of from about 40 to 95 w/o of Al$_2$O$_3$ and from about 5 to 60 w/o of a nitride and/or carbonitride of a metal of groups IV B, V B and VI B of the periodic system and from about 0 to 2 w/o of one or more sintering promoting oxides, the total composition of said nitrides and/or carbonitrides being given by the expression $(M_aM'_bM''_c)(C_xN_yO_z)_v$ where
M=Ti, Zr, Hf
M'=V, Nb, Ta
M''=Cr, Mo, W
and
a+b+c=1, b+c≦0.20; 0.85≦v≦1.05, x+y+z=1, x≦0.5, z≦0.15;

alloying the oxide matrix with nitrogen to stabilize the matrix and sintering the resulting mixture at a sufficient temperature to form a sintered body wherein from 2 to 95 v/o of the Al$_2$O$_3$ is a nitrogen-containing aluminum oxide with a spinel like cubic or nearly cubic structure, the balance of the Al$_2$O$_3$ comprising the stable hexagonal structure.

DETAILED DESCRIPTION OF THE INVENTION

The alloy composition of the present invention has a composition which is superficially similar to that shown in the mentioned publications. However, the alloy of the present invention has a special structure which yields surprising and favorable properties and, at the same time, uneconomical production steps as, for example, pressure sintering can be avoided. The invented alloy, which is normally produced by powder metallurgical techniques comprises essentially aluminum oxide and nitrides and/or carbonitrides of one or more metals of the groups IV B, V B and VI B of the periodic system and also one or more sintering promoting oxides, if necessary, as set forth above. The nitrides or carbonitrides can contain small amounts of oxygen.

Commercial primary nitride products often contain small concentrations of oxygen as an inpurity. However, if greater amounts than 15 a/o (atomic percent) of N or C are substituted, an unfavorable influence on the technological properties is obtained. The upper limit of the oxygen concentration of the nitride is consequently z≦0.15.

The excellent technological properties of materials according to the present invention have been obtained for concentrations where up to half the N-content can be substituted by C. The carbon concentration, given by x in the expression above, of the nitride can therefore vary between 0≦x≦0.5.

The expression given above relates to the total composition of the non-oxidic hard material component of the alloy according to the present invention. The good bonding properties which have been obtained with the composition of this invention (see below) have appeared independent of whether the carbonitride is added as a premanufactured homogenized carbonitride or whether carbides and nitrides are added separately in concentrations within the total composition range of the non-oxidic hard material component. At the actual sintering temperatures, an equalization of the composition occurs in the latter case because of dissolution of the carbides or nitrides partly or completely during sintering.

The alloy according to the present invention is characterized in the presence of a nitrogen containing aluminum oxide with a spinel-like cubic or nearly cubic structure. This nitrogen containing oxide, also called nitrogen stabilized cubic aluminum oxide, amounts to 2–95 v/o if the total fraction of aluminum oxide and the rest is $\alpha$-$Al_2O_3$ (corundum) with the normal hexagonal structure.

With the alloy composition of the present invention, it is possible to obtain pore free alloys with up to 60 w/o nitride with excellent bonding properties between the oxide and the nitride and with good technological properties as a consequence. The alloy can preferably be manufactured by pressureless sintering, which allows the manufacture of inserts of complex geometry possible without extensive grinding operations. The excellent bonding properties of the material according to the present invention are obtained by alloying the oxide matrix with nitrogen. The nitrogen-containing aluminum oxide or Al—O—N-compound which is formed appears suitable as an intermediate phase between the cubic nitride and the hexagonal aluminum oxide. The Al—O—N-compound is formed at a high temperature and increased volume, which contributes to an effective closure of pores ($\alpha$-$Al_2O_3$ = 3.99 g/cm$^3$) (Al—O—N = 3.68–3.69 g/cm$^3$). While it was previously known that nitrogen can stabilize cubic structures of spinel type (in addition it has been reported that structural defects can introduce lattice distortions which gives a c/a (ratio of lengths of the sides) ratio slightly less than 7) the mechanical properties of these spinel structures are not known. However, it has been reported that nitrogen stabilized cubic zirconium oxide has a considerably better fracture toughness ($K_{1C}$) than the non-stabilized tetragonal oxide.

The nitrogen stabilization of the oxide matrix of the alloy according to the present invention can be obtained by addition of a compatible nitride which is unstable during the sintering, e.g., AlN or $Mg_3N_2$. However, it it not possible to get a nitrogen stabilization solely with TiN as an additive because TiN is too stable to be a source of atomic nitrogen. It is also not possible to get nitrogen stabilization by sintering in nitrogen gas, because the reaction between $Al_2O_3$ and $N_2$ is not thermodynamically possible. However, if a reducing agent (for example carbon) is present at the same time, nitrogen stabilization of the oxide matrix can be obtained in sintering in $N_2$-gas or other nitrogen containing gases according to the reaction $Al_2O_3 + C + N_2 \rightarrow$ "AlON" + CO The alloy according to the present invention can therefore be obtained by sintering the composition in $N_2$ in the presence of free carbon or other reducing agents. However, the embodiment first mentioned (with addition of unstable nitrides) is preferable since the fraction of nitrogen stabilized cubic aluminum oxide is easier to control using that process.

The material according to the present invention can also be produced by the addition of "AlON" as a powder before grinding. "AlON" powder can be produced by annealing $Al_2O_3$ or $Al(OH)_3$ in $NH_3$.

The nitrogen addition must not be so large that free AlN would appear in the microstructure. The precipitation of AlN deteriorates the mechanical and technological properties. An obvious effect which is obtained in nitrogen stabilization of the oxide matrix is the smaller grain size compared with a non-stabilized material. This fact is one of the reasons for the improved technological properties. The stability to grain growth during sintering is increased by the increased number of phase boundary surfaces.

As earlier mentioned, one or more additional oxides can be included in compositions according to the invention (in concentrations up to 2 w/o of the mixture) to facilitate the sintering. However, most of the compositions within the composition range of the invention can advantageously be manufactured without the addition of such sintering promoting oxides. In cases where the addition of such oxides are done, magnesium oxide or other oxides of metals of group II A of the periodic system are used with advantage. Other oxides which can be added are one or more oxides of metals of group III B, such as yttrium oxide, group IV B, such as oxide of titanium, zirconium and/or hafnium, group V B, such as oxide of vanadium, niobium and/or tantalum, group VI B, such as oxide of chromium, molybdenum and/or tungsten, group VIII B, such as manganese oxide, group VIII, such as oxide of iron, cobalt and/or nickel or oxide or rare earth metals (neodymium oxide). In most cases, the addition of sintering promoting oxide is 0–1.5 w/o of the composition.

The preferred embodiment of materials according to the present invention are those in which the nitride or carbonitride comprises TiN or Ti(C,N). The desired fraction of nitrogen containing aluminum oxide with cubic or nearly cubic structure comprises 2 to 70 v/o of the total fraction of aluminum oxide of the material.

Most of the compositions within the composition range of the present invention can preferably be produced by pressureless sintering. However, when the composition contains high concentrations of nitrides or carbonitrides of the metals zirconium and hafnium, pressure sintering is preferred because a lower sintering temperature is required to obtain a pore free material.

An alternative which also can be used with advantage is to perform the last sequence of the sintering at a high pressure. In this case, one gets the advantage of performing the sintering at a lower temperature. In this instance, the material is first sintered by conventional pressure sintering or pressureless sintering until a non-communicating pore system has been obtained. In general, this means that the density is greater than 95% of the theoretical value. Then the material is sintered to complete tightness under high pressure in a protective gas atmosphere by hot isostatic pressing.

As the technological testing has been of essential importance in the inventive work on the alloy according to the present invention, the invention will be explained in the following Examples of machining tests performed with chosen compositions within the composition range. It should be understood, however, that the invention is not limited to the specific details of the Examples.

The nitride and carbide powders which were used for the preparation of the materials of the described tests, were commercial products.

EXAMPLE 1

Toughness tests in intermittent cutting

Conditions: Planing of slotted bar of cast iron

Material: Cast iron SIS 0125
Insert: SNGN 120412. Primary land: 0.2 mm×20°
Cutting Data:
  Cutting speed: 380 m/min
  Feed: 0.30 mm/rev.
  Cutting depth: 1.0 mm
  Life Criterion: breakage Toughness tests in intermittent cutting under conditions given above were conducted on a series of inserts made from 30 w/o TiN and 70 w/o $Al_2O_3$ in which the v/o amount of the aluminum oxide having the cubic structure was measured to be 0, 4, 10, 17, 34, 53, 69 and 90 v/o, respectively. The inserts were made by adding different amounts of AlN to mixtures of TiN and $Al_2O_3$ and sintering the mixture without pressure. The AlN reacts with the $Al_2O_3$ to form the cubic "AlON" structure during sintering. In addition, a material with free AlN in the microstructure was included along with (for comparison purposes), a commercially pressure-sintered material having the composition 70 w/o $Al_2O_3$ and 30 w/o TiC which represents the prior art technique of mixed ceramic materials.

Figure 1:
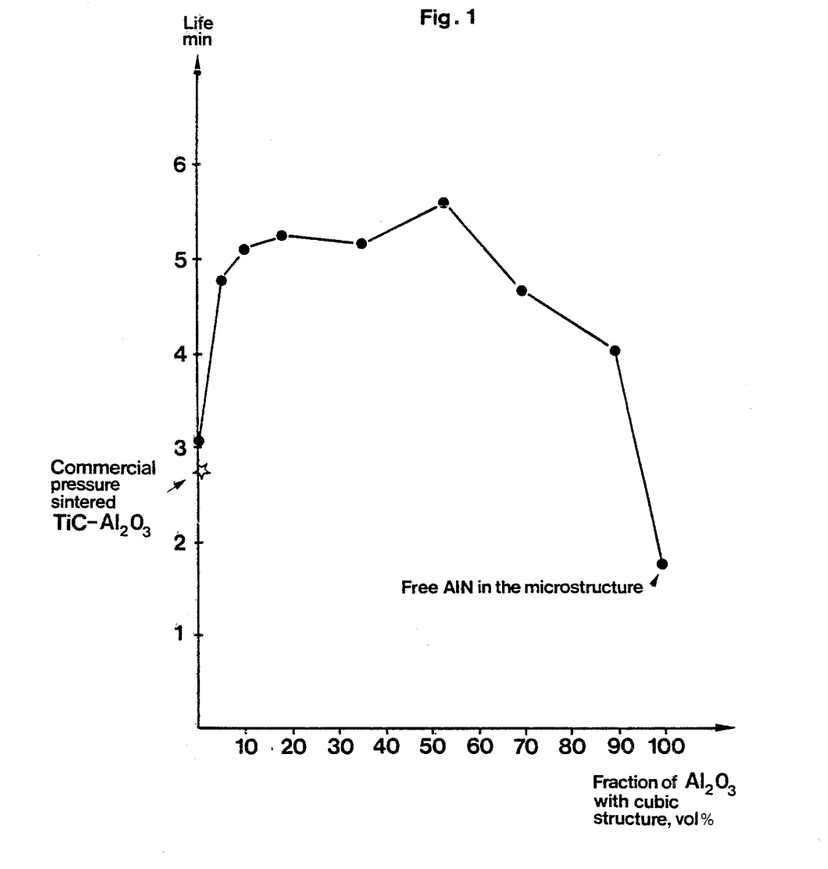
FIG. 1 is a graph of cutting life for a composition containing Al$_2$O$_3$ vs. the v/o of the fraction of the Al$_2$O$_3$ having a cubic structure.
Figure 2:
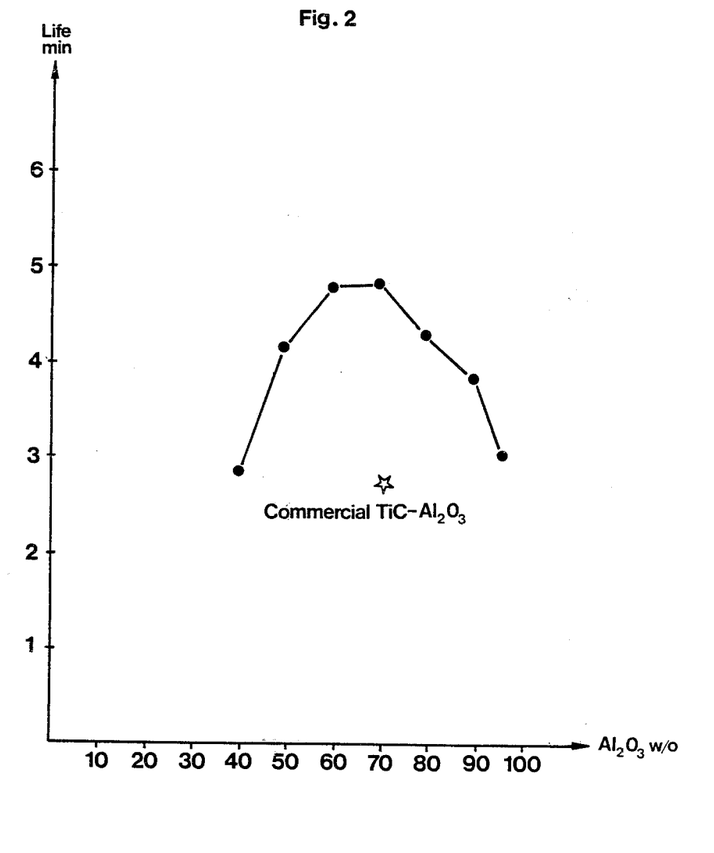
FIG. 2 is a graph of cutting life vs. the amount of Al$_2$O$_3$ in an Al$_2$O$_3$-containing composition.

The results obtained are shown in FIG. 1. It can be seen that the two-phase oxide matrix gave an extremely better toughness performance than that achieved with solely one-phase $\alpha$-$Al_2O_3$. FIG. 2 shows the influence of the $Al_2O_3$-concentration on a material with Ti(C,N) and 15-25 v/o "cubic $Al_2O_3$" of the total amount of $Al_2O_3$. The TiN/TiC-ratio was constantly 3/1. The presence of the cubic phase gave a very good toughness also for relatively high $Al_2O_3$-concentrations.

EXAMPLE 2

Wear resistance tests on cast iron

Conditions: Turning
Material: Cast iron SIS 0125
Insert: SNGN 120412, Primary land 0.2 mm×20°
Cutting data:
  Cutting speed: 490 m/min
  Feed: 0.30 mm/rev.
  Cutting depth: 1.5 mm Three different compositions of the present invention made by the procedure of Example 1 and containing 55 w/o $Al_2O_3$-45 w/o TiN, 80 w/o $Al_2O_3$-20 w/o Ti ($N_{0.75}C_{0.25}$) and 70 w/o $Al_2O_3$-30 w/o Ti ($N_{0.75}C_{0.25}$) with 30 to 50 v/o cubic $Al_2O_3$ (30, 33 and 50 v/o, respectively) were subjected to wear resistance tests on cast iron according to the mentioned conditions.

Figure 3:
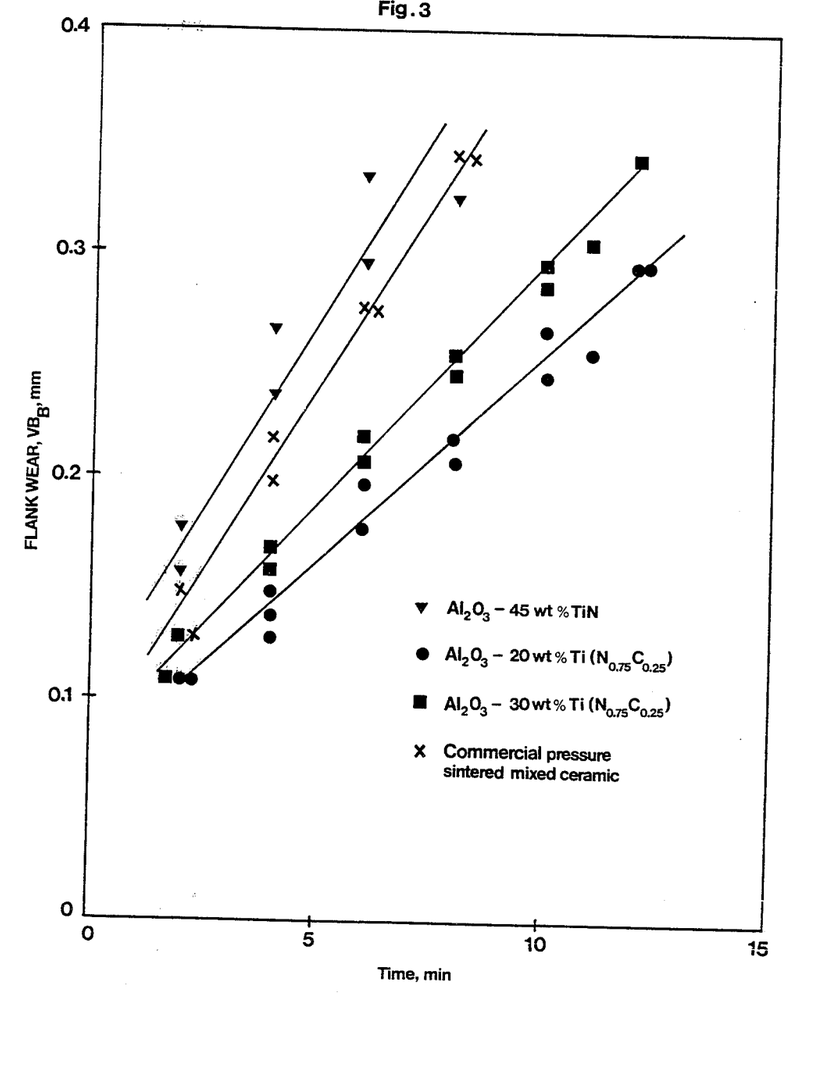
FIG. 3 is a graph of flank wear vs. time for a number of different compositions.

FIG. 3 shows the wear resistance, that is the flank wear $VB_B1$ mm, as a function of time, min. of these three compositions of the present invention compared with a commercial material with 70 w/o $Al_2O_3$ and 30 w/o TiC. The excellent bonding achieved with the present invention is illustrated by the flank wear resistance obtained even for such a low aluminum oxide concentration as 55 w/o which was at least as good as the flank wear resistance of the commercial material. For higher aluminum oxide concentrations, the flank wear resistance was superior to that of the commercial material.

EXAMPLE 3

Wear resistance tests in hardened and tempered steel

Figure 4:
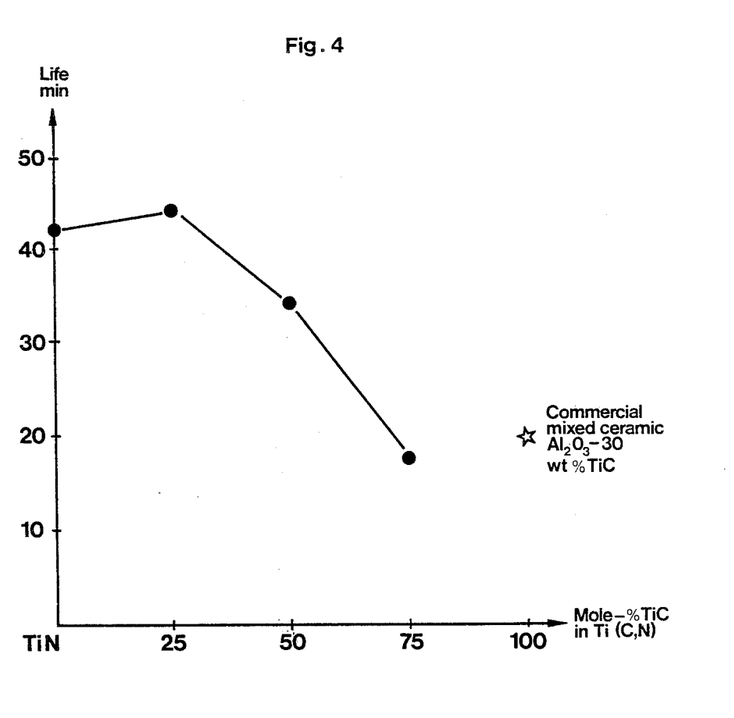
FIG. 4 is a graph of cutting life vs. the amount of TiC in a Ti (C,N)-containing composition.

Material: SIS 2541
Insert: SNGN 120412, Primary land 0.2 mm×20°
Cutting data:
  Cutting speed: 270 m/min
  Feed: 0.30 mm/rev.
  Cutting depth: 2 mm In this test, the tool life was determined by the crater wear resistance and the ability to withstand a weakened geometry caused by a strong crater wear without edge destruction. In the tests, materials made by the procedure of Example 1 with a constant $Al_2O_3$-concentration of 70 w/o and constant TiC-TiN-concentration of 30 w/o, but with varying TiC/TiN-ratio in the following m/o ranges: 75/25, 50/50, 25/75, and 0/100 were investigated. The fraction of "cubic $Al_2O_3$" of the total fraction of $Al_2O_3$ was 25-45 v/o (37, 45, 50 and 25 v/o respectively). The increased life of materials according to the present invention is evident from FIG. 4.

In light of, among other things, the results which have been obtained in the foregoing tests, it has been established that the compositional limits of the alloy of the present invention, while broadly within that set forth above, can vary somewhat depending on the particular purpose for the composition.

For example, the aluminum oxide concentration should not be less that 50 w/o to get a satisfactory level of the flank wear resistance; the carbon concentration of the carbonitride should not exceed 40 a/o of the total fraction of carbon, nitrogen and oxygen to obtain a satisfactory crater wear resistance in steel cutting; the fraction of "cubic $Al_2O_3$" of the total fraction of aluminum oxide should preferably be between 5 and 50 v/o to obtain the maximum improved toughness and wear resistance; the nitride or carbonitride should comprise at least 10 w/o of the composition to obtain a satisfactory toughness.

Also, the magnesium oxide (sintering promoter) concentration should not exceed 1 w/o, because $MgAl_2O_4$ can appear in the microstructure over this limit, which has an injurious effect on the toughness and cutting ability. The lower limit is set by the sintering inertia of the components. Materials based on TiN—$Al_2O_3$ and TiN/TiC—$Al_2O_3$ do not need any additives to obtain optimal properties, while materials with high concentrations of zirconium and hafnium need a higher sintering temperature whereby magnesium oxide has a positive effect on the grain growth stability of the present aluminum oxide. Other well known sintering promoting oxide additives such as titanium oxide, zirconium oxide, nickel oxide, chromium oxide, neodynium oxide and yttrium oxide can be added to the material in amounts up to about 2 w/o without changing the characteristic properties of the material according to the present invention. It is known that lithium oxide can stabilize a cubic nitrogen alloyed aluminum oxide, so even lithium oxide can be used as an additive to increase the alloying effect of nitrogen.

It has also been noted that impurities which may be obtained in the grinding of the basic material with grinding bodies of cemented carbides and from mill linings of steel should not change the essential properties of the alloy according to the present invention.

EXAMPLE 4

A mixture of 75 w/o $Al_2O_3$, 5 w/o TiC, 18 w/o TiN and 2 w/o AlN particles was carefully mixed by grinding in alcohol. 2 w/o polyethyleneglycol was added as a lubricant. The mixture was dried, homogenized and pressed to inserts. The pressed inserts were dewaxed in vacuum and sintered without pressure to full density for one hour at 1700° C. in a protective gas atmosphere.

The composition above gave 15 w/o "cubic Al₂O₃" of the total fraction of Al₂O₃.

The composition was used in turning tests according to the following conditions and with the following results.

Conditions: Precision machining of brake drum
Material: Cast iron, hardness HB 200-230
Insert: SNGN 120424, Primary land 0.05 mm×20°
Cutting data:
 Cutting speed: 500 m/min
 Feed: 0.21 mm/rev.
 Cutting depth: 0.8–1.0 mm
Wear criterion: not accepted surface
Result: life as number of work parts
 Pressured sintered pure ceramic (Al₂O₃): 3.4
 Pressure sintered mixed ceramic (Al₂O₃-30 w/o TiC): 5.3
Material according to the present invention: 7.2

EXAMPLE 5

A mixture of 65 w/o Al₂O₃, 2 w/o AlN and 33 w/o Ti(C,N) was carefully mixed by grinding in acetone. The titanium carbonitride was prepared by heating a mixture of 20 w/o TiC and 80 w/o TiN to 2150° C. for 4 h. The obtained mixture was charged into a graphite tool after drying and homogenization, and was pressure sintered at 1660° C. for 25 min at a pressure of 20 MPa. The composition above gave 12 v/o "cubic Al₂O₃" of the total fraction of Al₂O₃.

The composition was used in turning tests according to the following conditions and with the following results.

Conditions: Rough turning of cylinder liner
Material: Cast iron, hardness HB 245-290
Insert: SNGN 120816, Primary land: 0.2 mm×20°
Cutting data:
 Cutting speed: 630 m/min
 Feed: 0.55 mm/rev.
 Cutting Depth: 2–5.5 mm
Wear criterion: Chipping of the cutting edge
Result: Number of work parts per cutting edge
 Pressureless sintered pure ceramic (Al₂O₃): 5
 Pressure sintered mixed ceramic (Al₂O₃+30 w/o TiC): 16
 Material according to the present invention: 27

EXAMPLE 6

A mixture of 63.5 w/o Al₂O₃, 35 w/o TiN, 1 w/o AlN and 0.5 w/o MgO powders was carefully mixed by grinding in alcohol with an addition of 2 w/o polyethyleneglycol as a lubricant. The mixture was dried, homogenized and pressed to inserts. The pressed inserts were subjected to a heat treatment comprising dewaxing at 400° C. and sintering for 1 h at 1650° C. after which a closed pore system had been achieved. The sintered inserts were thereafter isostatically hot pressed to full density for 1 h at 1450° C. and 150 MPa. The obtained composition gave 8 v/o "cubic Al₂O₃" of the total fraction of Al₂O₃.

The composition was used in turning test according to the following conditions and with the following results.

Conditions: Turning of cast iron wheel
Material: Cast iron SIS 0120
Insert: SNGN 120412, Primary land 0.05 mm×20°
Cutting data:
 Cutting speed: 384 m/min
 Feed: 0.4 mm/rev.
 Cutting depth: 0.8 mm
Wear criterion: breakage
Result: Life as number of work parts
 Pressure sintered mixed ceramic (Al₂O₃-30 w/o TiC): 52
 Material according to the present invention: 92

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Ceramic alloy composition consisting essentially of from about 40 to about 95 w/o of aluminum oxide, and from about 5 to about 60 w/o of nitrides and/or carbonitrides of one or more metals of the group IV B, V B and VI B of the periodic system and from 0 to about 2 w/o of one or more sintering promoting oxides, the total composition of said nitrides and/or carbonitrides being given by the expression $$(M_a M'_b M''_c)(C_x N_y O_z)_v$$

where
 M = Ti, Zr, Hf
 M' = V, Nb, Ta
 M'' = Cr, Mo, W
and
 $a+b+c=1$, $b+c \leq 0.20$; $0.85 \leq v \leq 1.05$, $x+y+z=1$, $x \leq 0.5$, $z \leq 0.15$, the composition being further characterized in that from 2 to 95 v/o of the aluminum oxide matrix has a nitrogen-stabilized cubic structure, the balance of the aluminum oxide comprising the stable hexagonal (corundum) structure.

2. Alloy according to claim 1 wherein said sintering promoting oxide additives comprise 0–1.5 w/o of the composition.

3. Alloy according to either claim 1 or claim 2, wherein the said sintering promoting oxide comprises magnesium oxide.

4. Alloy according to claim 1 wherein $b+c \leq 0.10$.

5. Alloy according to claim 1 wherein the fraction of aluminum oxide matrix having the nitrogen-stabilized cubic structure comprises 5 to 50 v/o of the total fraction of aluminum oxide matrix.

6. Alloy according to claim 1 wherein said nitride and/or carbonitride comprises TiN and/or Ti(C,N).

7. A method of forming a ceramic alloy composition comprising forming a mixture consisting essentially of from about 40 to 95 w/o of Al₂O₃ and from about 5 to 60 w/o of a nitride and/or carbonitride of a metal of groups IV B, V B and VI B of the periodic system and from about 0 to 2 w/o of one or more sintering promoting oxides, the total composition of said nitrides and/or carbonitrides being given by the expression $$(M_a M'_b M''_c)(C_x N_y O_z)_v$$

where
 M = Ti, Zr, Hf
 M' = V, Nb, Ta
 M'' = Cr, Mo, W
and $a+b+c=1$, $b+c \leq 0.20$; $0.85 \leq v \leq 1.05$, $x+y+z=1$, $x \leq 0.5$, $z \leq 0.15$, alloying the oxide matrix with nitrogen to stabilize the matrix and sintering the resulting mixture at a sufficient temperature to form a sintered body wherein from 2 to 95 v/o of the $Al_2O_3$ matrix has a nitrogen-stabilized cubic structure, the balance of the $Al_2O_3$ comprising the stable hexagonal structure.

8. The method of claim 7 wherein the sintering is performed without externally applied pressure.

9. The method of claim 7 wherein the nitrogen stabilization is performed by sintering the composition in $N_2$ in the presence of one or more reducing agents.

10. The method of claim 7 wherein the oxide matrix is nitrogen stabilized prior to sintering.

11. The method of claim 10 wherein $Al_2O_3$ powder or its precursor are annealed in a nitrogen-containing gas to form an Al—O—N compound which is then used in the mixture with the said nitride and/or carbonitride.

12. The method of claim 7 wherein the nitrogen stabilization is performed by adding to the mixture prior to sintering a nitride which is unstable during sintering.

13. The method of claim 12 wherein the added nitride is AlN and/or $Mg_3N_2$.

14. A fine-grained sintered body consisting essentially of a ceramic alloy composition consisting essentially of from about 40 to about 95 w/o of aluminum oxide, and from about 5 to about 60 w/o of nitrides and/or carbonitrides of one or more metals of the group IV B, V B and VI B of the periodic system and from 0 to about 2 w/o of one or more sintering promoting oxides, the total composition of said nitrides and/or carbonitrides being given by the expression $$(M_aM'_bM''_c)(C_xN_yO_z)_v$$

where
M = Ti, Zr, Hf
M' = V, Nb, Ta
M" = Cr, Mo, W and
$a+b+c=1$, $b+c \leq 0.20$; $0.85 \leq v \leq 1.05$, $x+y+z=1$, $x \leq 0.5$, $z \leq 0.15$, the sintered body composition being further characterized in that from 2 to 95 v/o of the aluminum oxide matrix has a nitrogen-stabilized cubic structure, the balance of the aluminum oxide comprising the stable hexagonal (corundum) structure.

15. The fine-grained sintered body of claim 14 wherein said sintering promoting oxide additives comprise 0–1.5 w/o of the sintered body composition.

16. The fine-grained sintered body of either of claim 14 or claim 15, wherein the said sintering promoting oxide comprises magnesium oxide.

17. The fine-grained sintered body of claim 14 wherein $b+c \leq 0.10$.

18. The fine-grained sintered body of claim 14 wherein the fraction of nitrogen-stabilized cubic structure comprises 5 to 50 v/o of the total fraction of aluminum oxide.

19. The fine-grained sintered body of claim 14 wherein said nitride and/or carbonitride comprises TiN and/or Ti(C,N).

* * * * *